US008856097B2

(12) United States Patent
Ravikumar et al.

(10) Patent No.: US 8,856,097 B2
(45) Date of Patent: Oct. 7, 2014

(54) SYSTEM AND/OR METHOD FOR OBTAINING OF USER GENERATED CONTENT BOXES

(75) Inventors: Shanmugasundaram Ravikumar, Sunnyvale, CA (US); Prabhakar Raghavan, Sunnyvale, CA (US); Raghu Ramakrishnan, Santa Clara, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 953 days.

(21) Appl. No.: 12/022,980

(22) Filed: Jan. 30, 2008

(65) Prior Publication Data

US 2009/0192988 A1     Jul. 30, 2009

(51) Int. Cl.
G06F 17/30        (2006.01)
G06F 7/00         (2006.01)
G06Q 30/06        (2012.01)

(52) U.S. Cl.
CPC .......... *G06F 17/30864* (2013.01); *G06Q 30/06* (2013.01)
USPC ............. 707/706; 707/736; 715/206; 705/50

(58) Field of Classification Search
CPC ...................................................... G06F 21/10
USPC ...................... 707/736, 706; 705/50; 715/206
See application file for complete search history.

(56) References Cited

U.S. PATENT DOCUMENTS

| | | | |
|---|---|---|---|
| 6,366,923 B1 * | 4/2002 | Lenk et al. ............................. | 1/1 |
| 6,697,821 B2 * | 2/2004 | Ziff et al. ............................... | 1/1 |
| 6,697,825 B1 * | 2/2004 | Underwood et al. .......... | 715/207 |
| 6,721,713 B1 * | 4/2004 | Guheen et al. .................. | 705/1.1 |
| 6,796,486 B2 * | 9/2004 | Ohashi ............................ | 235/375 |
| 6,836,768 B1 * | 12/2004 | Hirsch ................................. | 1/1 |
| 6,957,186 B1 * | 10/2005 | Guheen et al. .................. | 705/1.1 |
| 6,959,288 B1 * | 10/2005 | Medina et al. ................... | 705/51 |
| 6,987,987 B1 * | 1/2006 | Vacanti et al. .............. | 455/556.2 |
| 7,054,830 B1 * | 5/2006 | Eggleston et al. .......... | 705/14.26 |
| 7,165,105 B2 * | 1/2007 | Reiner et al. .................. | 709/224 |
| 7,254,581 B2 * | 8/2007 | Johnson et al. ........................ | 1/1 |
| 7,373,318 B2 * | 5/2008 | Kutsumi et al. .............. | 705/26.7 |
| 7,451,152 B2 * | 11/2008 | Kraft et al. ............... | 707/999.01 |
| 7,546,295 B2 * | 6/2009 | Brave et al. ............ | 707/999.006 |
| 7,555,478 B2 * | 6/2009 | Bayley et al. .......................... | 1/1 |
| 7,647,351 B2 * | 1/2010 | Monsarrat ..................... | 715/235 |
| 7,752,082 B2 * | 7/2010 | Calabria ...................... | 705/26.1 |
| 2001/0010329 A1 * | 8/2001 | Ohashi .......................... | 235/375 |
| 2006/0070012 A1 * | 3/2006 | Milener et al. ................ | 715/822 |
| 2006/0101341 A1 * | 5/2006 | Kelly et al. ................... | 715/738 |
| 2006/0143067 A1 * | 6/2006 | Calabria ......................... | 705/10 |
| 2006/0287916 A1 * | 12/2006 | Starr et al. ...................... | 705/14 |
| 2007/0038931 A1 * | 2/2007 | Allaire et al. ................. | 715/526 |
| 2007/0198353 A1 * | 8/2007 | Behringer et al. ............. | 705/14 |
| 2008/0004944 A1 * | 1/2008 | Calabria ......................... | 705/10 |

\* cited by examiner

*Primary Examiner* — Pavan Mamillapalli
(74) *Attorney, Agent, or Firm* — Berkeley Law & Technology Group, LLP

(57) ABSTRACT

The subject matter disclosed herein relates to a process for receiving, evaluating and selecting of content modules such as content summary boxes and landing pages for display on network-accessible search engine results page. In one particular example, potential content providers may be provided with incentives and guidelines for the preparation of content summary boxes and landing pages over an electronic communications network, and the resulting submissions can be ranked and published in conjunction with the display of a search engine results page over the network.

20 Claims, 6 Drawing Sheets

Web | Images | Video | Local | Shopping | more --

| game plan | Search | Options ▼ |

The Game Plan (2007) ~21
Movies.yahoo.com ~20
Yahoos B+, Critics C Quarterback Joe Kingman is known as one of the toughest players to ever take the field.
Blessed with amazing strength and agility..... ~17
www.gogameplan.com - 17k – Cached ~16

Showtimes Fremont, CA
XX Cinedome 7 Newark: (2:25p), 5:00p), 7:40p
XX Century Union City 25: (11:35a), (2:15p), (4:50p), 7:25p
XX Century 20 Great Mall: 11:20a ~18      More ...

[Theatrical Trailer image]  ~19

Yahoo! Shortcut - About

1 The Game Plan Trailer – Apple.com ~15
 Watch the trailer for the movie The Game Plan In QuickTime format and available in high definition and for iPods.
 www.apple.com/trailers/disney/thegameplan - 6k - Cached
  ~15
2 The Game Plan – Official Movie Website
 Official site for the movie The Game Plan, starring Dwayne "The rock" Johnson as an NFL quarterback living the bachelor lifestyle who discovers he has a 7-year-old ....
 www.gameplaninball.com - 156k – Cached 3 Game Plan Pinball ~15
 Dedicated to preserving Game Plan pinball machnines.
 www.gameplanpinball.com - 9 – Cached

FIG. 2

THE GAME PLAN

Movie Main Page

Movie Overview
Movie Details
Showtimes & Tickets
DVD/Video Info
Trailers & Clips
Cast and Credits
Awards & Notifications

Reviews and Previews
Critics Reviews
User Reviews
Greg's Preview
Movie Mom's Preview

Photos
Premiere Photos
Production Photos

Community
Message Board

SHOWTIMES & TICKETS

ALL THEATERS FOR: 94536 | FAVORITE THEATERS – SIGN IN

LOCATION: 94536 | CHANGE LOCATION

DATE: TODAY, WED. NOV 14 ▼   BUY TICKETS FROM MOVIETICKETS.COM BY CLICKING LINKED SHOWTIMES.

Cinedome 7 Newark
6000 NewPark Mall, Nevark, DCA, 94560   Map It
(2:25), (5:00), 7:40

Century Union City 25
32100 Union Landing, Union City, CA 94587   Map It
(11:35am), (2:15), (4:50), 7:25, 10:00

Century 20 Great Mall
1010 Great Mall Drive, Milpitas, CA 94587   Map It
11:20am

FIG. 3

SYSTEM AND/OR METHOD FOR OBTAINING OF USER GENERATED CONTENT BOXES

BACKGROUND

1. Field

The subject matter disclosed herein relates to content boxes for inclusion in search engine results.

2. Information

Search engines such as the Yahoo and Google search engines commonly provide results to user queries as part of on a search engine results page ("SERP"). If the query is related to a specific topic, such as, for example, a movie, restaurant, store, service, governmental organization or function, entertainment attraction, natural attraction, or other object of interest, the search engine may select a content box to display concurrently with the search results. A content summary box for a movie might provide information such as the movie title, a link to one or more theatrical trailers for the movie, facts about the movie, showtimes, and so forth. Content boxes are currently prepared by staff and may be identified to the search engine as pertaining to a particular object or topic by tags or other means.

BRIEF DESCRIPTION OF THE FIGURES

Non-limiting and non-exhaustive embodiments will be described with reference to the following figures, wherein like reference numerals refer to like parts throughout the various figures unless otherwise specified.

FIG. 2 is a representation of the results portion of a search engine results page with a content summary box.

FIG. 3 is a representation of a landing page.

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Unless specifically stated otherwise, as apparent from the following discussion, it is appreciated that throughout this specification discussions utilizing terms such as "processing", "computing", "calculating", "associating", "identifying", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

Many search engines are accessible by users over an electronic communications network. This network may comprise, in whole or in part, a public network such as the Internet, a company local area network ("LAN"), wide area network ("WAN"), virtual private network ("VPN"), as well as other types of electronic telecommunications networks. The present embodiments may be discussed in connection with use of the Internet as at least a part of the electronic communications network.

Figure 1:
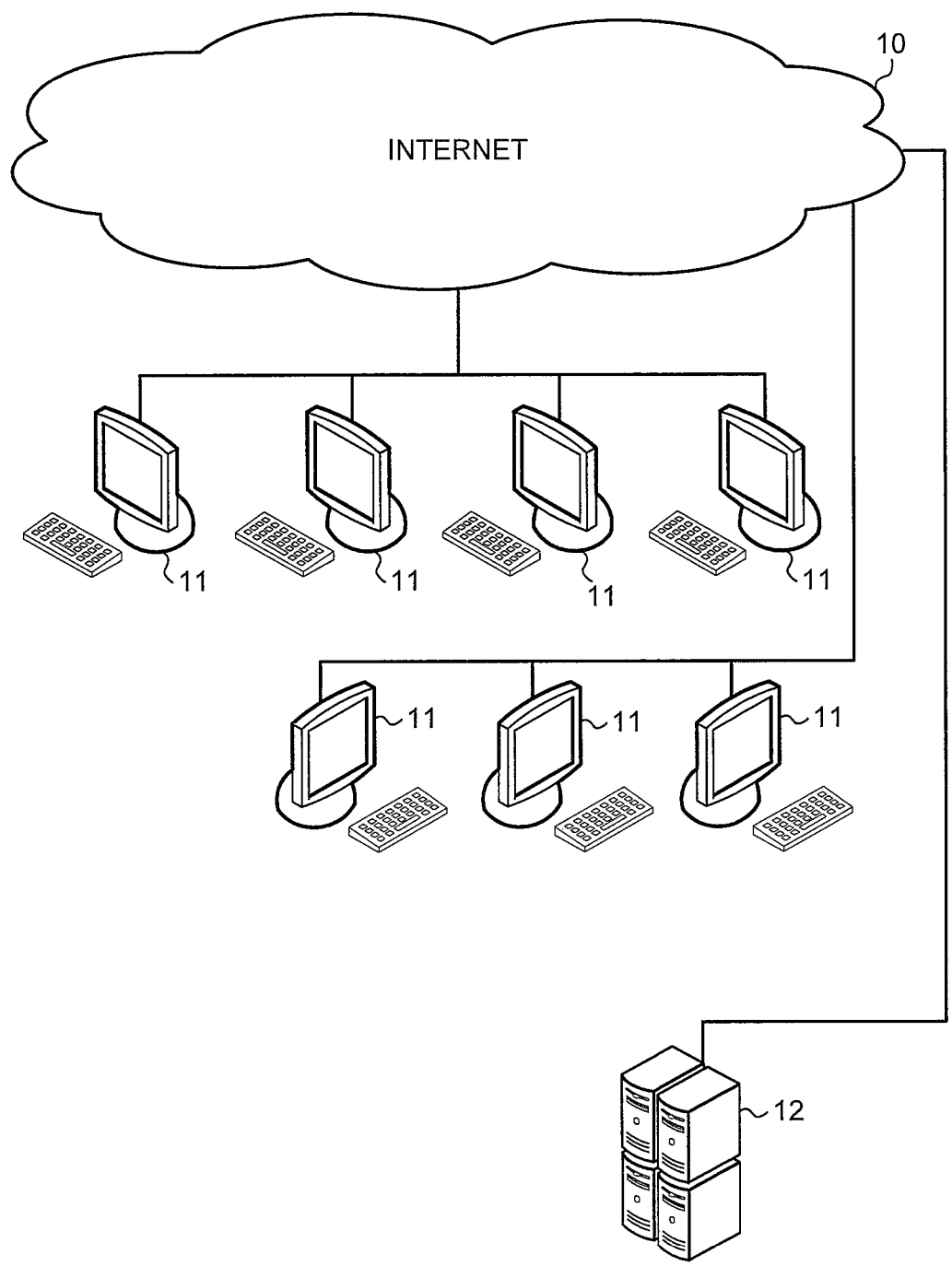
FIG. 1 is a schematic representation of a plurality of user computing devices connected to a server via an electronic communications network.

Referring to FIG. 1, in one embodiment, an electronic communications network 10 such as the Internet may be used to provide electronic communications between a plurality of user computing devices 11 and a server 12. The user computing devices 11 may include such devices as desktop computers, workstations, notebook and tablet computers, palmtop computers, cellular telephones, personal digital assistants, and other network-enabled communications devices.

In the present embodiment, user computing devices 11 may communicate with server system 12 over the electronic communications network 10 via any of a variety of ways. As examples, a user computing device 11 may comprise a desktop computer in a corporate setting that is connected to a company LAN that, in turn, is connected to the Internet. Another user computing device 11 may comprise a notebook computer connected by wire or wirelessly to a cable modem through which a cable Internet service provider provides access to the Internet. Yet another user computing device 11 may comprise a web-enabled cell phone that communicates over a cellular telephone company's network that in turn is connected to the Internet. The server system 12 may comprise a single computer platform, but may alternatively comprise a plurality of computing devices acting in concert, and connection to an electronic communications network 10 such as the Internet may be accomplished by any of a variety of known means. Browser software may be operational on the user computing devices 11 to permit access to the server system 12 via the World Wide Web ("the Web"). Both ordinary users and content providers may use the computing devices 11 to communicate with the server 12.

Search engine software may be hosted on the server system 12 to receive and process queries that may be submitted by users via the user computing devices 11. A user may employ a user computing device 11 to connect to a search engine query page over the Web to submit a query to the search engine software. The search engine software may then process the query and return results to the query to the user in the present embodiment by displaying a search engine results page.

In addition to providing a listing of search results, a search engine provider, such as Yahoo, Inc. may wish to provide specific content to a user that relates to the subject of a user's query. This may be accomplished by providing content modules, such as a content summary box and/or landing page in connection with one or more results on the SERP. Content modules such as content summary boxes and landing pages may be prepared by staff and may be identified to the search engine as pertaining to a particular subject by any of a variety of known techniques. For example, tags identifying the subject matter of a content summary box may be associated with the content summary box to enable a search engine to identify an appropriate content module. Content modules such as landing pages may also be tagged to facilitate selection by a search engine, but may also be accessed by a hyperlink to a content module such as a content summary box. Results may include the SERP (with content summary box) and/or the landing page. Content summary boxes may appear on landing pages as well as on more classical search engine results pages.

The time and cost of having staff prepare content modules arises due to the large number of items, services and attractions for which such content modules may be desired. For example, a search engine provider may wish to have content modules for movies, consumer, business and industrial products and services, theme parks, books and magazines, and other things regarding which individuals may search. In addition to the large number of items, services and attractions currently in existence, new items, services and attractions are continually being released, modified, updated and/or the like. For example, new movies, books, automobiles and the like are regularly released, and new clubs, restaurants, theaters, stores and the like come into existence. Accordingly, the cost for maintaining staff to prepare content modules is significant.

Referring to FIG. 2, an example of a search engine results page is depicted. In response to the query "game plan," a search engine, such as the Yahoo search engine, may provide a list of results 15 identifying web pages that match the query. Subsequent screens with additional results 15 may also be displayable. In FIG. 2, server software has additionally responded to the query by displaying a content summary such as a content summary box 16 at the head of the column of results 15. Content summary box 16 may, of course, be displayed at some other location such as the side or bottom of the web page, if desired, without deviating from claimed subject matter.

Content summary box 16 may comprise an area of the screen in which information relevant to the subject of the search query is provided. In one embodiment, as shown in FIG. 2, content summary box 16 may occupy a space a plurality of screen lines in height and positioned above the column of search results 15. The width of content summary box 16 may be approximately as great as the margin width of the search results 15 displayed beneath it. While the area occupied by content summary box 16 may be of any desired shape or size, in the present embodiment, referring to FIG. 2 and as discussed above, content summary box 16 may occupy a generally rectangular portion of the web page.

In one embodiment, a content summary box 16, may provide information about a subject in an abbreviated format. In the case of the aforementioned query "game plan," for example, the search engine in the embodiment illustrated in FIG. 2 has called up a content summary box relating to the movie "The Game Plan." Unlike the search results 15, which contain links to individual web pages located in the search, content summary box 16 of the present embodiment contains such information as summary 17 of the story line of the movie, showtimes 18 for a particular locale (in the present instance, a locale indicated by the user), link 19 to a theatrical trailer, link 20 to information on critical reviews, and link 21 to a landing page 24 that is dedicated, for example, to providing more comprehensive information on the subject of the query (see FIG. 3).

Other information may be included in content summary box 16, and the nature of the information displayed will depend on the subject and type of the content summary box 16. For example, if the search query had been for a particular brand of digital camera, a content summary box might include links to technical specifications, pictures of the camera, links to online or other stores where the camera may be purchased, a link to a landing page 24 that may be dedicated to the brand or class of camera, and so forth, as indicated in connection with FIGS. 5 and 6.

As shown in FIG. 3, a landing page 24 may be a content module that includes information on the subject of the content summary box 16. This may be additional information and links such as column 25 of links to relevant web sites as seen in FIG. 3, and may include further information, such as column 26 of expanded theater listings. Additional descriptions, links and information may also be provided on a landing page 24. Results, of course, may include the search engine results page (with content summary box) and/or a landing page 24 that may be linked to from a content summary box 16. Content summary boxes 16 may appear on landing pages 24 as well as on search engine results pages.

Figure 4:
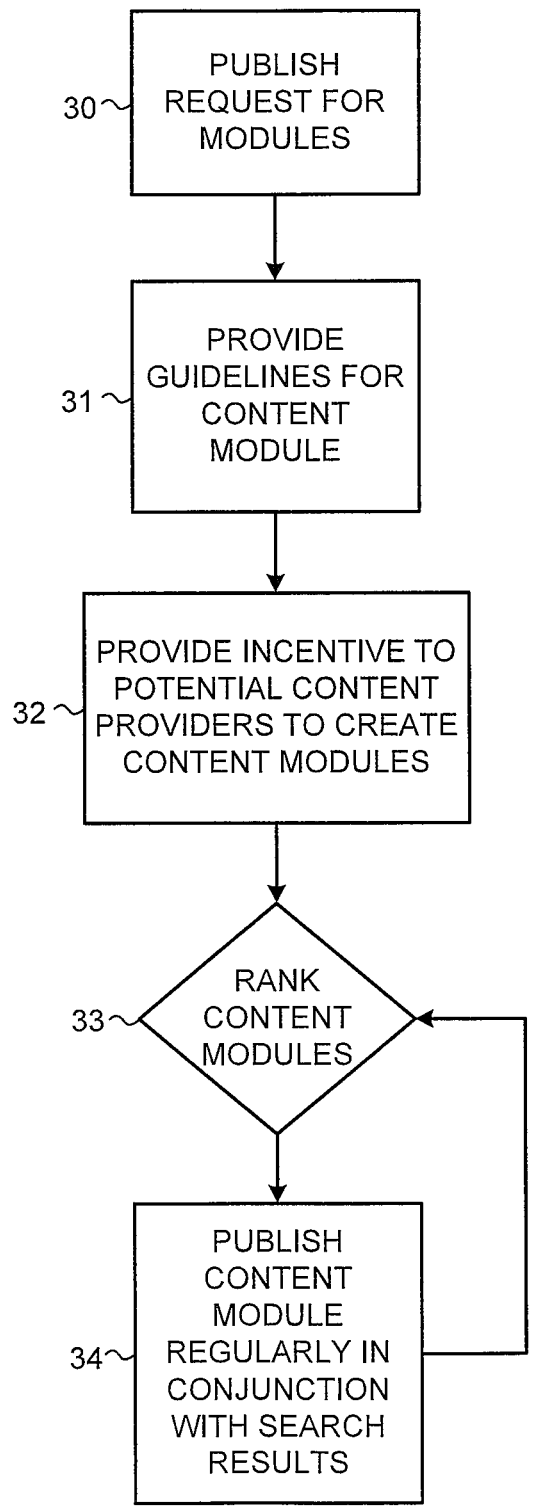
FIG. 4 is a process flow diagram for one embodiment of the present method.

In one embodiment, and referring to FIG. 4, content modules may be created, populated and provided by third party content providers. In order to achieve this, a request 30 for potential content providers to create content modules may first be published. Information may be published to a plurality of potential content providers to provide content modules on a variety of subjects that may be preselected or that may be chosen in response to interests expressed by potential content providers. For example, potential content providers may be granted access to content modules such as content summary boxes 16 and landing pages 24 for their review. Such potential content providers may further choose to create content modules to compete with existing content modules, or may perceive a need for a new content module for a product, service or the like that does not have an associated content summary box 16 or landing page 24.

A variety of methods may be used to publish a request for the creation of content modules. For example, search engine pages may contain a link that announces the request and invites the potential content providers to participate in the creation of the content modules. The announcements may also be placed as advertisements on web pages or otherwise, may be emailed to known potential content providers, and/or may be published on a content provider web page.

Computer users may provide content voluntarily, for example, if they have a particular interest in a particular subject, they may be attracted to create a content summary box relating to the subject. However, in order to attract potential content providers, who may or may not be users of the search engine, an incentive 31 may be provided for preparing a successful content module. In one embodiment, notice of the incentive may be provided with the initial solicitation for content providers. Incentives may also be described in a publication, such as a web page, that is directed to potential content providers.

Guidelines for the creation of content modules such as a content summary box 16 may be provided in any of a number of ways. These may include publishing guidelines and specifications in text form, and/or use of a wizard for creation of content summary boxes 16 and/or other content modules. In the present embodiment, and with reference to FIG. 5, the guidelines may be embodied in whole or in part in a web page that includes a content summary box template or plurality of templates.

Figure 5:
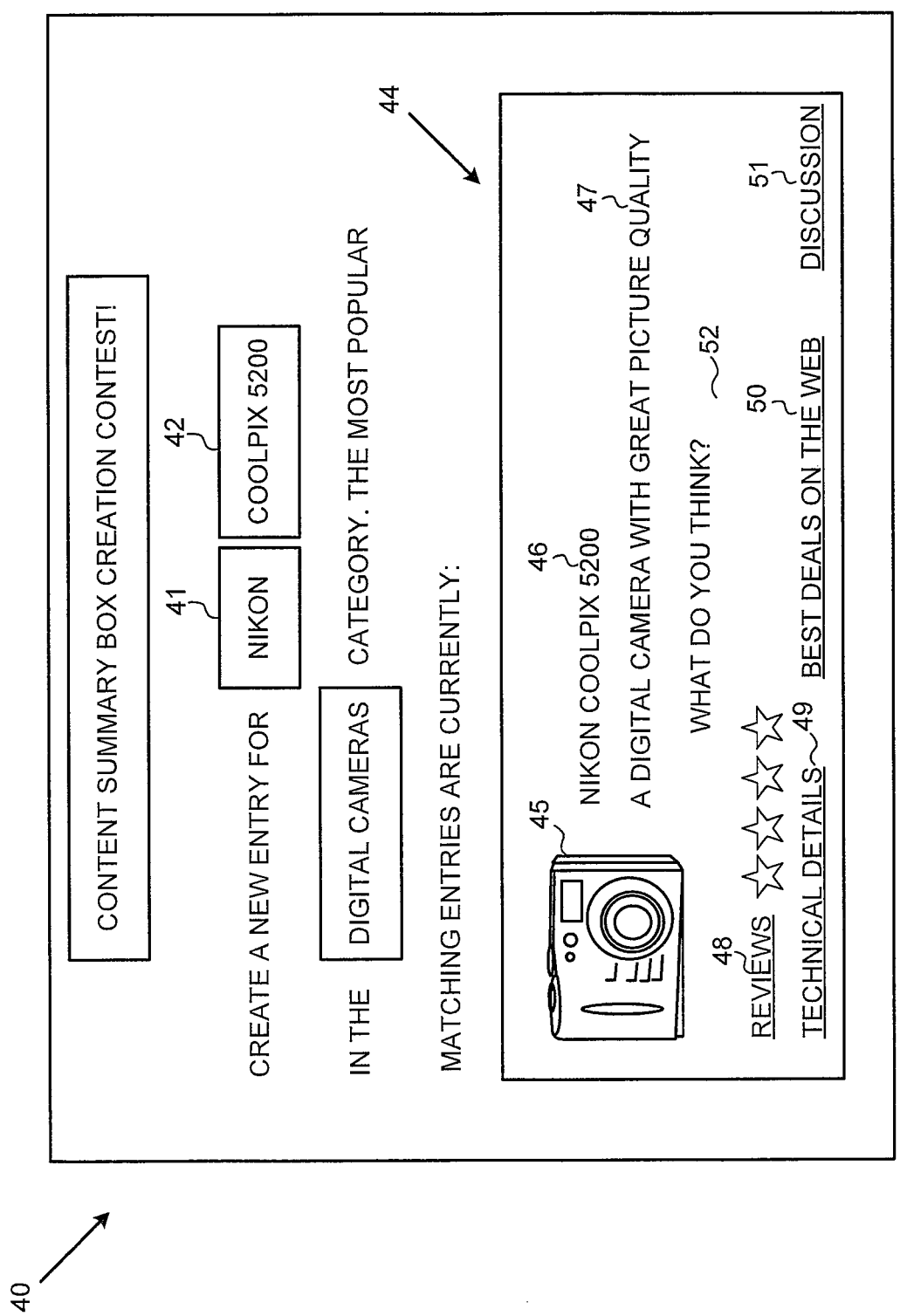
FIG. 5 depicts a web page with a template for a content summary box.

Referring to FIG. 5, in one embodiment a content summary box template 40 for a consumer product such as a digital camera may include a plurality of product identification boxes 41, 42 in which a user may enter data such as the manufacturer (in the present case, Nikon) and model number (in the present case, the Coolpix 5200 camera). Other boxes, such as a category box 43 may be included.

At this stage, in the present embodiment, the web page may display the most popular content summary box 44 that has been created. In the present embodiment, this content summary box 44 includes an image of the product 45 that may be an imbedded graphic or that may be linked to an image file or files. A title 46 for the content summary box 44 may be positioned beside the image, and may provide a link to an external web page such as a manufacturer's web site.

Space may be provided in the content summary box for a comment 47 by the author. This comment 47 may also be associated with a link, for example, to a landing page 24 or a page containing further comments.

Other related links may be provided in the content summary box 44. For example, links to reviews 48, specifications 49, vendors 50 and one or more discussion forums 51 may be contained in the content summary box 44. Additionally, a space may be provided in the content summary box 44 for entry of users' or the author's more detailed comments about the subject of the content summary box 44.

Figure 6:
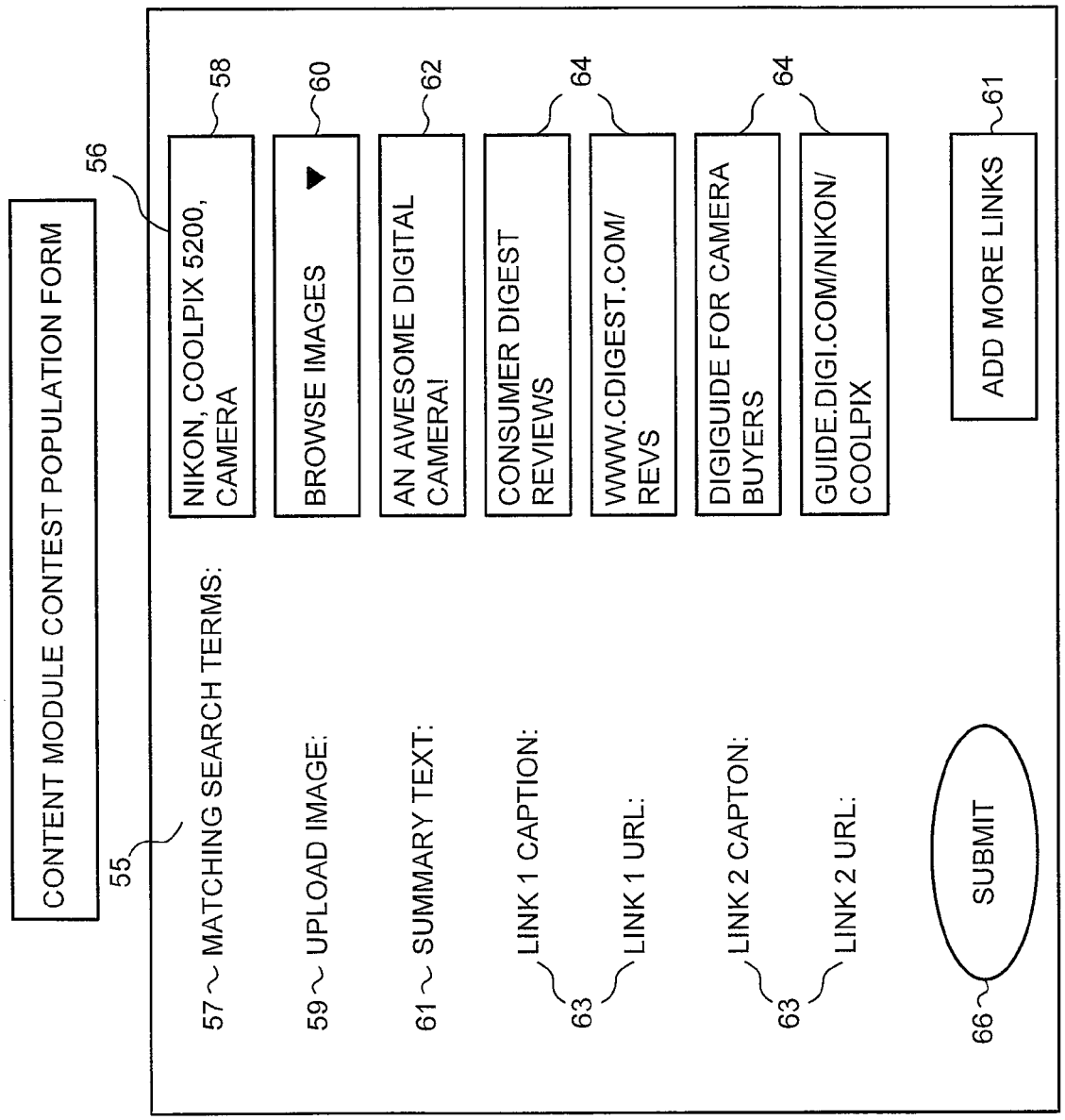
FIG. 6 depicts a web page providing a form for population of the template of FIG. 5.

In one embodiment, the content provider may be enabled to populate a content summary box using the layout of the displayed content summary box 44 using a form such as that shown in FIG. 6. This form may contain a column 55 of labels with a corresponding column 56 of boxes fillable by the content provider. For example, the label 57 "Matching search terms:" is positioned opposite a box 58 in which the content provider may enter the search terms "Nikon," "Coolpix 5200" and "camera," or other search terms appropriate to the subject of the content summary box 40. While the search terms box 58 may allow free form entry of search terms, drop-down menus of selectable terms or other means of constraining and standardizing search terms may be used.

Another label 59 may identify an image box 60 in which a link to an image may be entered and/or, as shown in FIG. 6, a down arrow may be selected to open a drop-down menu of selectable images. Other means that may be used for selection of images may include allowing a content provider to upload his or her own image or allowing the content provider to link to one or more images available on the Internet.

In the present embodiment, a label 61 for a text summary may be associated with a box 62 for entry of a summary of the subject of the content summary box 40, such as, "An awesome digital camera!."

Pairs of labels 63 for captions and links may be provided in association with boxes 64 for entry of labels to be displayed and links to be associated with the labels. For example, in the present embodiment, a user may enter the text "Consumer Digest Reviews" in a caption box 64 and then enter the web address of a particular review or reviews available over the Internet in the associated box 64 for web addresses.

The form may also allow the content provider to request more pairs of boxes for entry of additional captions and links. In one embodiment, as shown in FIG. 6, a clickable button 65 is provided that will call up additional pairs of labels 63 and boxes 64 for the entry of the additional captions and links.

A submit button 66 may be provided on the forms web page as shown in FIG. 6 to allow a content provider to submit the entered data upon completion of the data entry process.

Referring to FIG. 4, incentives 32 may be provided to motivate potential content summary providers to prepare content summary boxes. Incentives may induce a larger pool of potential content providers to prepare content modules, and may motivate them to work harder and be more competitive in preparing the content modules in order to increase the chance that their content modules will be selected and will remain in use notwithstanding subsequently-prepared content modules from other content providers.

When a link in a content summary box 16 is activated, for example, the owner of the web page on which the content summary box is displayed may receive compensation from the web site to which the user's browser is directed by activation of the link. In such case, the incentive for preparation of a content summary box 16 may be a portion of the revenues derived from clickthroughs originating from a content module such as a content summary box 16.

Another incentive for preparation of content modules such as a content summary box 16 may be inclusion of attribution of authorship in the content module. For example, a portion of a content summary box 16 might be set aside for identification of the content provider, such as by an image, name and/or link to the web site of a content provider. Content providers might respond to such an incentive to achieve recognition and reputation among other content providers and users.

Yet another incentive might be the prospect of revenue generated by inclusion of advertisements, such as advertisements selected and made available by the search engine provider that a content provider may select from a list or menu. In broader terms the incentive may comprise publicity for a content provider-chosen business, association, activity, group, website, product or service. This may generate direct revenue, as from payments in response to clickthroughs or the like.

Other incentives may be provided, including allowing the content provider to include paid content such as advertisements and the like in the content module.

Referring to FIGS. 2-6, once content summary modules such as the content summary box 40 has been prepared and submitted, the submissions may be ranked 33 for selection of the content summary box or boxes that may be displayed on search engine results pages in response to user queries. While the submissions may be pre-screened, as for appropriateness of content, and ranked 33 for selection by, for example, employees of the search engine provider, other methods of ranking 33 may be employed instead of or in addition to employee ranking.

In one embodiment, user responses to the content summary box 16 may be used in ranking 33 of the content summary box 16. This may include monitoring of behavioral cues may be used at least in part to rank or select a content box or boxes 16. Such behavioral cues may include detection of mouseovers, in which the user causes the pointer of the mouse to hover over a portion of a content summary box 16. Higher rankings might be achieved for content summary boxes 16 that had a higher percentage of mouseovers for a given number of displays of the content summary box 16 on a search engine results page. Another behavioral cue that may be the basis for ranking is the frequency of clicks on links contained in the content summary box 16. Ranking buttons such as thumbs up and thumbs down buttons may be displayed in content summary boxes as another behavioral cue of user sentiment concerning a content summary box 16.

In another embodiment, a plurality of candidate content summary boxes 16 may be displayed to search engine users or a subset thereof and the users may be allowed to vote for or otherwise rank the candidate content summary boxes 16.

These and other methods of ranking 33 may be used alone or in combination to select one or more content summary boxes 16 that may be regularly published 34 with search engine results pages. Of course, as new content summary boxes 16 are created and submitted, they can be ranked 33 against the then-current content summary box 16 by the various methods, and the current content summary box 16 may be displaced by such newly-created or upgraded submission.

As mentioned above, content summary boxes 16 may be limited in the amount of information they can include. Landing pages 24 may be used to provide additional information, such as pictures, links, written descriptions, and other materials appropriate to the subject of a content box. Content providers who prepare content summary boxes 16 may wish also to prepare landing pages 24 that may be referenced in the content summary box 16. For example a link to the landing page 24 may be placed in the content summary box 16.

The two content modules, that is, the content summary box 16 and landing page 24 may be treated as a unit for ranking 33 and publication 34 purposes. Alternatively, content summary boxes 16 and landing pages 24 may be ranked 33 and published 34 independently of one another such that one content provider's content summary box 16 may be linked to the landing page 24 submitted by another content provider. In such case, the method for requesting content summary modules 30, providing of guidelines 31, incentivizing 32, ranking 33 and publishing 34 of content summary boxes discussed above may be used to cause content providers to prepare landing pages and to select a landing page or pages 24 to publish.

Tools such as templates and forms may also be used to allow users to create templates for content summary boxes 16 and landing pages 24 that they or other users can use in the creation of content summary boxes 16 and landing pages 24.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

We claim:

1. A method comprising:
    publishing an offer of an incentive for content providers to prepare content modules for at least one subject, the offer specifying at least one designated subject for which at least one of the content modules is requested, the content modules comprising content relating to query subject matter of a search engine query, wherein at least one of the content providers comprises a computer user, the content modules comprising at least one link to an external web page;
    publishing at least one guideline for creation of the content modules to the at least one of the content providers;
    receiving the content modules from a plurality of the content providers via an electronic computer network;
    ranking the content modules based on ranking criteria; and
    in response to receiving the search engine query:
        publishing search results responsive to the query subject matter;
        publishing at least one of the ranked content modules based, at least in part, on the query subject matter; and
        providing the incentive to the content providers in response to receiving a user selection of the at least one link to the external web gage of the content modules.

2. The method of claim 1 wherein the content modules comprise content summary boxes, and further comprising including landing page access information in the content summary box.

3. The method of claim 2 further comprising:
    providing an incentive for content providers to prepare landing pages for a subject;
    receiving content-provider-prepared landing pages from a plurality of content providers via the network;
    selecting at least one of the landing pages provided by the content providers for presentation over the network in response to use of the landing page access information by a user to whom the at least one of the selected content modules is displayed; and
    publishing the at least one of the selected content modules to a subset of the search engine users based, at least in part, on the query subject matter.

4. The method of claim 1 wherein the incentive comprises one or more of:
    indication of authorship for one or more of the content modules;
    monetary compensation based on user access to the one or more of the content modules;
    one or more advertisements for a content provider-chosen business, association, activity, group, website, product or service; or
    inclusion of paid content in the one or more of the content modules.

5. The method of claim 1 wherein said selecting comprises:
    monitoring user responses relating to one or more of the content modules;
    ranking the one or more of the content modules relative to at least one other of content modules directed to the same subject based at least in part on monitored user responses.

6. The method of claim 1 wherein one or more of the content modules is associated with the subject and is displayed to the subset of search engine users based, at least in part, on the subject of their queries.

7. The method of claim 1 further comprising providing the at least one guideline over the network to a plurality of content providers.

8. The method of claim 1, wherein the incentive comprises a monetary payment.

9. An apparatus comprising:
    a server system for receiving content-provider-prepared content modules from a plurality of content providers via an electronic computer network, the content modules comprising content relating to query subject matter of a search engine query, at least one of the content providers comprising a computer user, wherein an offer of an incentive and at least one guideline for creation of the content modules are to be published to the content providers, the offer to specify at least one designated subject for which at least one of the content modules is to be requested, the content modules comprising at least one link to an external web page; and
    the server system to:
        rank the content modules based on ranking criteria;
        wherein in response to receiving the search engine query:
        publishing search results responsive to the query subject matter;
        publishing at least one of the ranked content modules based, at least in part, on the query subject matter; and
        providing the incentive the content providers in response to receiving a user selection of the at least one link to the external web page of the content modules.

10. The apparatus of claim 9 wherein the content modules comprise content summary boxes, and wherein the content summary boxes include landing page access information.

11. The apparatus of claim 10 wherein the server system is further adapted to:
    receive content-provider-prepared landing pages from a plurality of content providers via the network, the content providers to be provided with an incentive to prepare landing pages for a subject;

select at least one of the landing pages provided by the content providers for presentation over the network in response to use of the landing page access information by a user to whom the at least one of the selected content modules is displayed; and publish the at least one of the selected content modules to a subset of the search engine users based on the query subject matter.

12. The apparatus of claim 9 wherein the incentive comprises one or more of:
   indication of authorship for one or more of the content modules;
   monetary compensation based on user access to the one or more of the content modules;
   one or more advertisements for a content provider-chosen business, association, activity, group, website, product or service; or
   inclusion of paid content in the one or more of the content modules.

13. The apparatus of claim 9 wherein the selection of one or more of the content modules is based at least in part on:
   monitored user responses relating to a selected content module by the users;
   a ranking of the selected content module relative to at least one other content module directed to the same subject based at least in part on monitored user responses.

14. The apparatus of claim 9 wherein the server system is adapted to display one or more of the content modules at least in part based on a relation between the subject of the one or more of the content modules and the search engine query.

15. An article comprising:
   one or more memories comprising machine readable instructions stored thereon which are executable by a computing platform to:
   process content-provider-prepared content modules to be received from a plurality of content providers via an electronic computer network, the content providers to be provided with an incentive to prepare content summaries for at least one subject, the content modules comprising content relating to query subject matter of a search engine query, at least one of the content providers comprising a computer user, wherein an offer of an incentive and at least one guideline for creation of the content modules are to be published to the content providers, the offer to specify at least one designated subject for which at least one of the content modules is to be requested, the content modules comprising at least one link to an external web page;
   ranking the content modules based on ranking criteria; and
   in response to receiving the search engine query:
      publishing search results responsive to the query subject matter;
      publishing at least one of the ranked content modules based, at least in part, on the query subject matter; and
      providing the incentive the content providers in response to receiving a user selection of the at least one link to the external web page of the content modules.

16. The article of claim 15 wherein the content modules comprise content summary boxes, and the instructions are further executable by the computing platform to include landing page access information in the content summary box.

17. The article of claim 16, wherein the instructions are further executable by the computing platform to:
   provide an incentive for content providers to prepare landing pages for a subject;
   receive content-provider-prepared landing pages from a plurality of content providers via the network;
   select at least one of the landing pages to be provided by the content providers for presentation over the network in response to use of the landing page access information by a user to whom the at least one of the selected content modules is to be displayed; and
   publish the at least one of the selected content modules to a subset of the search engine users based on the query subject matter.

18. The article of claim 15 wherein the incentive comprises one or more of:
   indication of authorship for one or more of the content modules;
   monetary compensation based on user access to the one or more of the content modules;
   one or more advertisements for a content provider-chosen business, association, activity, group, website, product or service; or
   inclusion of paid content in the one or more of the content modules.

19. The article of claim 15 wherein the selection is to be identified, at least in part, by:
   monitoring user responses relating to a selected content module;
   ranking the selected content module relative to at least one other content module directed to the same subject based at least in part on monitored user responses.

20. A method comprising:
   providing at least one template for the preparation of content summary boxes to a plurality of content providers over an electronic computer network, wherein at least one of the content providers comprises a computer user, the content modules comprising at least one link to an external web page;
   publishing an offer of at least one incentive, the at least one incentive comprising one or more of:
      indication of authorship for at least one of the content summary boxes,
      monetary compensation based on user access to the at least one of the content summary boxes,
      one or more advertisements for a content provider-chosen business, association, activity, group, website, product or service, or
      inclusion of paid content in the at least one of the content summary boxes;
   publishing at least one guideline for creation of the content modules to the at least one of the content providers;
   receiving content-provider-prepared content summary boxes from said plurality of content providers via the network;
   selecting at least one of the content summary boxes provided by the content providers, the selecting being based at least in part on the results of monitoring of user responses to the content summary box; and
   ranking the content modules based on ranking criteria; and
   in response to receiving the search engine query:
      publishing search results responsive to the query subject matter;
      publishing at least one of the ranked content modules based, at least in part, on the query subject matter; and
      providing the incentive the content providers in response to receiving a user selection of the at least one link to the external web page of the content modules.

* * * * *